United States Patent [19]
Mishima et al.

[11] Patent Number: 5,427,637
[45] Date of Patent: Jun. 27, 1995

[54] V-RIBBED BELT AND METHOD OF FABRICATING THE SAME

[75] Inventors: Kyoichi Mishima, Higashimachi; Toshimi Kumazaki, Hyogo; Masahiko Kawashima, Nishimachi, all of Japan

[73] Assignee: Mitsuboshi Belting Ltd., Kobe, Japan

[21] Appl. No.: 966,315

[22] Filed: Oct. 23, 1992

Related U.S. Application Data

[62] Division of Ser. No. 615,225, Nov. 19, 1990, Pat. No. 5,197,928.

[51] Int. Cl.$^6$ .......................... B29C 67/00; F16G 5/08
[52] U.S. Cl. ...................... 156/137; 474/263
[58] Field of Search ................. 156/137–142; 474/263–268

[56] References Cited
U.S. PATENT DOCUMENTS
4,956,036  9/1990  Sedlacek ................ 156/137
5,197,928  3/1993  Mishima et al. ........ 156/137 X

*Primary Examiner*—Michael Powell Buiz
*Attorney, Agent, or Firm*—Wood, Phillips, VanSanten, Clark & Mortimer

[57] ABSTRACT

A method of forming a power transmission belt including the steps of: providing a belt sleeve defining an axis and having a rubber layer with elongate fibers embedded therein and extending generally parallel to each other in a first line; rotating the belt about its axis; providing a grinding element for cutting the rubber layer and fibers to define ribs with oppositely facing flanks; and urging the rotating belt sleeve and grinding element, one against the other in first and second steps and, as an incident thereof, causing the grinding element to define the oppositely facing flanks. The belt sleeve and grinding element are urged one against the other transversely of the first line at a first speed during the first step and at a second speed different than the first speed during the second step.

20 Claims, 3 Drawing Sheets

V-RIBBED BELT AND METHOD OF FABRICATING THE SAME

CROSS REFERENCE

This is a divisional application of application Ser. No. 615,225 filed Nov. 19, 1990, entitled "V-Ribbed Belt and Method of Fabricating the Same", now U.S. Pat. No. 5,197,928.

BACKGROUND OF THE INVENTION

1. Field of the Invention

This invention relates to power transmission belts and, more particularly, to a belt in which fibers are embedded in the belt body and exposed at the belt flanks to minimize noise generation as the belt flanks engage and separate from a cooperating pulley. The invention is also directed to a method of forming the power transmission belt to increase the exposed surface area of the fibers at the belt flanks.

2. Background Art

V-ribbed belts are used in a number of diverse environments. Exemplary applications for V-ribbed belts are in automobiles and other types of vehicles, agricultural equipment, domestic electrical equipment, etc.

The typical V-ribbed belt has a plurality of longitudinally extending, parallel ribs which engage within correspondingly configured pulley grooves. The V-ribbed belt has a number of advantages over conventional V-belts. Most of the advantages of the V-ribbed belt stem from its thin construction. This not only gives the belt a compact configuration, but makes it highly flexible which allows it to be used in conjunction with small diameter pulleys. Because of the inherent flexibility of the V-ribbed belt, the bending stresses in the belt in use are minimized, which accounts for a long belt life. At the same time, the flexibility of the V-ribbed belt accounts for the system driving the belt consuming significantly less energy. A further advantage of the V-ribbed construction is that normally the ribs do not move radially into the cooperating pulley grooves as far as a conventional V-belt would. This reduces the frictional forces on the belt during operation and results in a prolonging of the belt life as well as additional energy savings.

The V-ribbed belt construction does, however, have some drawbacks. The V-ribbed belt is prone to slipping relative to cooperating pulleys if the tension on the belt becomes excessive and/or if there is an abrupt variation in load on the associated system. The result of this may be a shortened belt life as a result of the belt rubber being abraded or cracking or the belt otherwise wearing out.

Another problem with V-ribbed belt systems results from the shallower grooves required in the pulleys around which the belt is trained. Since the ribs do not have to extend radially inwardly into the grooves as far as with V-belts, the pulley grooves are commonly made of a relatively shallow depth. A result of this is that dust, sand, mud and other foreign matter encountered in the operating environment, tend to accumulate in the pulley grooves. This foreign matter may not only prevent full seating of the ribs in the pulley grooves, which could result in belt slippage, but also abrades the belt rubber in use which may shorten the belt life.

A still further problem with V-ribbed belts is that of noise generation as the belt ribs move into and out of engagement with the cooperating pulleys. Noise is also generated as the belt slips in a circumferential direction during system operation.

One proposed solution to the problem of noise generation has been the provision of a cloth layer on the belt ribs. The cloth layer does reduce noise generation and wear on the belt rubber, but introduces new problems. First, the application of the cloth layer involves an additional manufacturing step. This complicates manufacturing and increases the attendant costs. Further, the cloth itself is prone to failure and, once this occurs, continued use of the belt may become impractical.

An alternative to the provision of a cloth layer is the use of short fibers which are commonly sprayed onto the belt flank surfaces. While the use of sprayed on fibers does in fact reduce noise levels and abrasion on the belt body, the application of the fibers, as with the aforementioned cloth, complicates belt manufacture. Further, it is difficult to permanently adhere the short fibers to the belt flanks and, consequently, the fibers tend to fall off during use. The beneficial effect of the fibers may then not be consistently realized during the life of the belt. Further, the flexing characteristics of the belt are altered by the provision of each of the cloth and fibers.

A further proposed solution to the above problems has been the embedding of a fabric layer in the ribs during manufacture. This has proven impractical in V-belts since the ribs, in most applications, do not have sufficient depth to accommodate the fabric layer.

The V-ribbed belts of the prior art have been constructed in various different manners. One such method is disclosed in Japanese Patent Publication No. 52-15310. This publication discloses a matrix manufacturing method employing a cylindrical mandrel which is surrounded by a tubular, vulcanized, rubber forming sleeve. The sleeve has axially spaced, circumferential, V-shaped grooves integrally formed therein and corresponding to the desired end shape of the ribs of the V-ribbed belt. The belt components are sequentially built up onto the forming sleeve. In one exemplary belt construction, a flat rubber layer is initially wound onto the sleeve or, alternatively, that layer is molded in place. Tensile cords are then spirally wound around the rubber layer to press the rubber layer into partial conformance with the grooves. An additional rubber layer followed by a fabric layer are then laminated in place after which the belt components are vulcanized. The vulcanized belt sleeve is then cut to produce individual belts.

The matrix method of belt formation has inherent drawbacks. One of the biggest problems is encountered when the first rubber layer against the forming sleeve is not a molded layer, as for example when it is applied as a sheet layer. As the belt components are vulcanized, the rubber layer conforms fully to the ribs. As this occurs, the tensile cords tend to conform to the contour of the forming sleeve; that is, the tensile cords tend to move radially into the grooves and bend around the walls between the adjacent grooves. The tensile cord orientation thus deviates from the desired straight longitudinal direction. The irregular tensile cord pattern commonly results in an effectively bent/slackened tensile cord which straightens under load to allow undesirable elongation of the belt.

While molding of the first placed belt rubber layer against the forming sleeve eliminates the above problem, it also complicates manufacture. The number of belt forming steps is increased, which adds undesirably to the cost of the belt.

A further problem common to both matrix formation methods described above is that it is difficult to remove the vulcanized belt sleeve wrapped around the forming sleeve. Further, the life of the forming sleeve is inherently short due to the fact that it is repetitively subjected to severe conditions such as heating at high temperatures, high pressure compression, cooling, etc.

Another belt formation method is disclosed in Japanese Patent Publication No. 52-17552. In this publication, the ribs are formed by grinding. The belt components are sequentially built up onto a mandrel in an inside out arrangement. In one exemplary belt construction, the following layers are built up in sequence: fabric; a rubber layer; tensile cords; and an outer rubber layer which defines the innermost layer of the completed belt. Once all belt components are in place, the belt sleeve is vulcanized. A grinding wheel, having a plurality of circumferential V-shaped grooves, is urged against the outermost rubber layer to define the belt ribs. To accomplish this, both the belt sleeve and the grinding stone/grinding wheel are rotated about substantially parallel axes as they are moved, one against the other, at right angles to their rotational axes.

It is known to define V-ribbed belts with short, laterally extending fibers in the compression section. When the ribs are defined by conventional grinding techniques, such as that described above, the fibers are cleanly severed in the same plane as the belt flanks. There is a tendency of the grinding wheel to melt the rubber and in so doing cover the lateral-most surface of the severed fibers with rubber during this process. Consequently, little or no part of each fiber ends up being directly exposed at the belt flanks. The result is that the belt flank is effectively solid rubber which has a high coefficient of friction compared to the fibers and which binds as the ribs encounter the pulley surfaces and move away therefrom during operation. The result is undesirable noise generation, which was previously discussed.

While increasing the quantity of laterally extending fibers in the compression section overcomes the above problem, results in more exposed fibers at the belt flanks, and achieves the desired result of decreasing the frictional coefficient, the quantity of fibers necessary to accomplish this may compromise the integrity of the belt compression section. Further, as the number of fibers increases, it becomes more difficult to uniformly distribute the fibers. The flexibility and life of the belt may also be compromised. Increasing the number of fibers can create points of weakness in the rubber in which the fibers are embedded.

Another known method of dealing with the above noted problems is disclosed in Japanese Patent Publication No. 58-34697. In this publication, a belt sleeve is disclosed with an inner, expansible canvas layer, which is formed together with the ribs during manufacture.

The difficulty with the above method is that the canvas employed is expandable readily only in a single direction. If the canvas is arranged to be expandable in the longitudinal direction of the belt, it is difficult to conform the canvas transversely thereto around the individual ribs. If the canvas is aligned to be expandable laterally of the belt, while this facilitates formation of the canvas around the ribs, flexibility of the belt is deteriorated. The result is excessive heat generation and possible cracking as the belt is flexed during operation.

SUMMARY OF THE INVENTION

The present invention is specifically directed to overcoming the above-enumerated problems in a novel and simple manner.

According to the invention, a power transmission belt is provided having a belt body defining laterally spaced, oppositely facing flank surfaces for engagement with a pulley and at least one fiber within the belt body and extending in a lateral direction. The fiber has a cross-sectional area taken transversely of its length and a surface exposed at at least one of the flank surfaces. The exposed fiber surface is flared to have an area that is greater than the cross-sectional area of the fiber.

Accordingly, the area of the fiber exposed at the belt flank surface is effectively increased. This reduces the coefficient of friction for the rubber belt flank surfaces and results in reduction of noise generation as the belt flank surfaces impact and separate from the cooperating pulley surfaces. The effective exposed surface area of the fibers is increased without increasing the number of fibers so that the integrity of the belt body can be maintained while realizing the improved noise reducing benefits.

In a preferred form, a plurality of the fibers are provided in the belt body. Each fiber is flared so that its exposed surface area at the belt flank is 1.5 to 5 times the cross-sectional area of the fiber.

The invention can be practiced with all types of belts, i.e. V-belts, V-ribbed belts, and other frictionally operating belt configurations. The invention is particularly adaptable to V-ribbed belts containing a plurality of longitudinally extending ribs, each having oppositely facing flank surfaces.

Many different arrangements of belt components are also contemplated by the invention. In a preferred form, the belt has an inside surface and an outside surface with the outside surface defined by a fabric sheet.

The fibers may be made from any of a number of different materials. For example, the fibers may be made from synthetic materials such as nylon, vinyl alcohol, polyester, aromatic polyamid, etc. Alternatively, the fibers can be natural fibers such as cotton and pulp. The fibers can be all synthetic or a combination of synthetic.

In a preferred form, the fibers extend laterally and are embedded in a rubber matrix with the ratio of fibers to rubber being 5–30 parts by weight of fiber to 100 parts by weight of rubber. Preferably, when there is a mixture of natural and synthetic fibers, each type of fiber is in a quantity of less than 30 parts by weight to 100 parts by weight of rubber.

The flaring of the exposed end of the fiber can be accomplished by any of a number of different techniques. In a preferred form, the exposed end of the fiber is melted by a grinding wheel. Preferably, the grinding wheel has a surface roughness of 80 to 200 meshes.

In a preferred form, the fibers are provided in the compression section of the belt. The exposed surface area of the fibers in the compression section is preferably between 40% to 80% of the total surface area of the flank surfaces for the compression section of the belt.

Preferably, the rubber in which the fibers are embedded is at least one of NR, SBR, CR.

The invention further contemplates a power transmission belt having a body defining a tension section and a compression section, a plurality of longitudinally extending ribs, each having laterally spaced oppositely facing flank surfaces for engagement with a pulley, and a plurality of elongate fibers within each rib and extending generally in a lateral direction. Each fiber in the plurality of fibers has a cross-sectional area taken transversely to its length and an exposed surface at at least one of the rib flank surfaces. The exposed surfaces are flared to define a surface area greater than the cross-sectional area of each of the plurality of fibers.

The present invention also contemplates a method of forming a power transmission belt consisting of the steps of: providing a belt sleeve defining an axis and having a rubber layer with elongate fibers embedded therein and extending generally parallel to each other in a first line; rotating the belt sleeve about its axis; providing a grinding element for cutting the rubber layer and fibers to define ribs with oppositely facing flanks; and urging the rotating belt sleeve and grinding element, one against the other in separate first and second steps to cause the grinding element to define the oppositely facing rib flanks. The belt sleeve and grinding element are urged, one against the other, at a first speed during the first step and at a second speed different than the first speed during the second step.

In a preferred form, the first speed is greater than the second speed.

It is a principal objective of the present invention to manufacture belts by a method which effects an enlargement of the effective area of the fibers exposed at the belt flanks.

To most effectively accomplish this, the first step speed is at least 0.3 mm/min. with the second step being less than 0.3 mm/min.

Preferably, the grinding element is rotated about an axis as the rotating belt sleeve and grinding element are urged, one against the other. The axes are preferably substantially parallel with the grinding element and sleeve preferably rotated oppositely about their respective axes.

The belt sleeve and grinding element have outer edges. The outer edge of the belt sleeve preferably rotates at at least 0.07 m/sec during the first step while the outer edge of the grinding element rotates at at least 15 m/sec during the first step. During the second step, the outer edge of the belt sleeve rotates at no more than 0.07 m/sec and the outer edge of the grinding element rotates at less than 15 m/sec.

During the second step, the belt sleeve and grinding element move relative to each other transversely of their axis between 0.1 and 1 mm to a final position in which the belt flank surfaces are fully formed.

The invention also contemplates a method of forming a power transmission belt consisting of the steps of: providing a belt sleeve defining an axis and having a rubber layer with elongate fibers embedded therein and extending generally parallel to each other in a first line; providing a grinding element for cutting the rubber layer and fibers to define oppositely facing belt flanks; urging the rotating belt sleeve and grinding element, one against the other, through a range to cause the grinding element to define the oppositely facing belt flanks; and rotating the grinding element and rotating belt sleeve at a first relative rotational velocity during a first part of the range and at a second relative rotational velocity during a second part of the range.

The belt sleeve and grinding element are urged, one against the other, from a first relative position in which the belt sleeve and grinding element initially engage to a final relative position in which the oppositely facing belt flanks are fully defined. The relative rotational velocity of the grinding element and belt sleeve is the slower of the first and second relative rotational velocities as the belt sleeve and grinding element move into their final relative position.

Preferably, the belt sleeve and grinding element rotate oppositely about their respective axes.

Preferably, the grinding element is a grinding wheel having a surface roughness of 80 to 200 meshes and preferably 100 to 120 meshes.

DETAILED DESCRIPTION OF THE DRAWINGS

Figure 1:
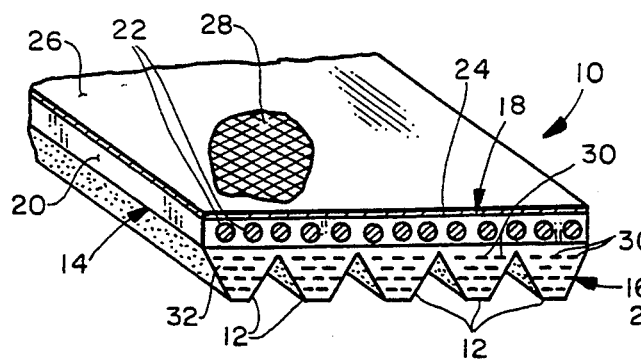
FIG. 1 is a perspective, cross-sectional view of a V-ribbed belt according to the present invention.
Figure 2:
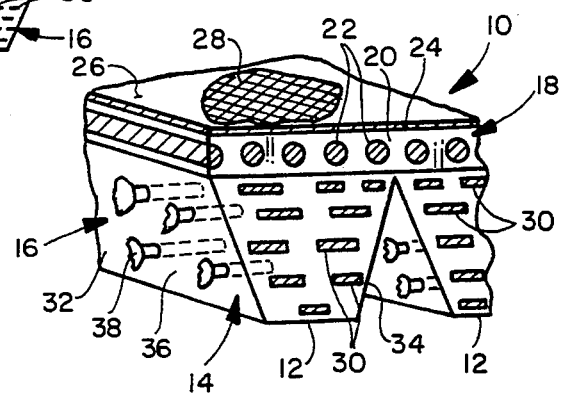
FIG. 2 is an enlarged perspective view of one part of the body of the belt in FIG. 1 taken in cross section.

In FIGS. 1 and 2, a V-ribbed belt is disclosed at 10, made in accordance with the present invention. The belt 10 is what is known in the art as a V-ribbed belt, which belt 10 includes a plurality of parallel, longitudinally extending ribs 12. It should be understood that while the invention is described with respect to a V-ribbed belt construction, it is applicable in the same manner with other belts, such as a conventional V-belt and other endless belt constructions operable through frictional engagement with a pulley system.

The belt 10 has a body 14 consisting of an inner compression section 16 and an outer tension section 18. The tension section 18 consists of a rubber matrix 20 in which longitudinally extending tensile cords 22 are embedded. The tensile cords 22 are made of low elongation, high strength bundles of fibers of polyester, nylon, aromatic polyamid fiber, etc. The rubber making up the tension section 18 may be made entirely of one of NR, SBR, CR, etc., or a combination thereof.

The outer surface 24 of the tension section 18 has adhered thereto a rubber-coated canvas layer 26. While one such layer 26 is shown, a plurality of the layers could be employed consistently with the invention. The canvas layer 26 is preferably made of woven warp and weft cotton yarns 28.

The ribs 12/compression section 16 are made preferably from the same rubber as that making up the tension section 18. According to the invention, short fibers 30 are dispersed within the rubber 32 defining the ribs 12. The fibers 30 are elongate and oriented to extend generally parallel to each other in a lateral direction with respect to the belt 10. These fibers are preferably 3 to 10 mm in length and are either synthetic or natural fibers. The synthetic fiber material is preferably one of nylon, vinyl alcohol, polyester, aromatic polyamid, etc. The natural fibers may be cotton, pulp, etc. The fibers can be all synthetic, all natural, or a combination thereof.

Preferably, the fibers 30 are provided in the quantity of 5–30 parts by weight to 100 parts by weight of rubber in the belt compression section 16. When synthetic and natural fibers are mixed, and the synthetic fibers are not present in the amount of at least 30 parts by weight to 100 parts by weight of rubber, it is preferred to add natural fibers to increase the overall fiber content to a maximum 30 parts by weight of fiber to 100 parts by weight of rubber.

To explain the details of the present invention, the description herein will be focused on the belt rib 12 on the left end of the belt body 14 in FIG. 1. The belt rib 12 defines laterally oppositely facing flank surfaces 34, 36. According to the invention, the exposed surface 38 of the belt fibers 30 is flared so that its effective diameter is increased over the undeformed cross-sectional area of the body of the fibers 30. This flaring is effected preferably by the manufacturing process which is described below. During the manufacturing process, the exposed surfaces 38 of the fibers 30 are melted, although other methods which would effect the same result are contemplated by the invention.

Preferably, the exposed surface 38 of each of the fibers 30 has an area of from 1.5 to 5 times as large as the cross-sectional area of the untreated fibers. The untreated/undeformed fibers generally have a cylindrical configuration with a substantially uniform cross-sectional area throughout their lengths. According to the invention, the ratio of the area of the exposed surfaces 38 of the fibers 30 to the area of the belt flank surfaces 34, 36 is in the range of 40–80%. The significance of the flaring step is that it allows the exposed surface area of the fibers 30 to be increased without increasing the quantity of fibers within the rubber 32.

If the flared surfaces 38 have an area of less than 5.0 times the cross-sectional area of the fibers 30, it is necessary to increase the quantity of fibers sufficiently that the flexibility of the belt is diminished. If the exposed surfaces 38 of the fibers 30 are compressed to have an exposed area of greater than 1.5 times the cross-sectional area of the fibers, the exposed portions of the fibers of the belt flanks 34, 36 become weak and may readily break off during operation.

If the combined area of the surfaces 38 is less than 40% of the belt flank surface area for the compression section 16, there is sufficient rubber in the compression section exposed during operation to directly contact the pulleys and generate an undesirable amount of noise in use. At the same time, if the amount of rubber exposed is sufficiently large, the flank surfaces 34, 36 are susceptible to significant wear over time.

On the other hand, if the area of the exposed surfaces 38 of the fibers 30 is greater than 80%, the friction coefficient between the belt and the pulley is reduced to the extent that a driving force is ineffectively transmitted by the belt 10.

Figure 3:
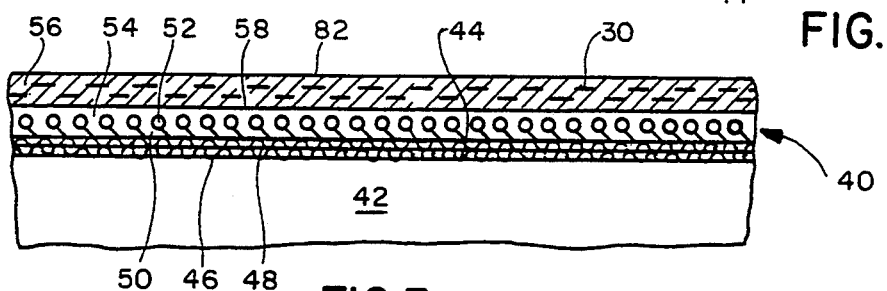
FIG. 3 is a cross-sectional view of belt components built up into an exemplary belt sleeve into which individual ribs are formed according to the present invention.
Figure 4:
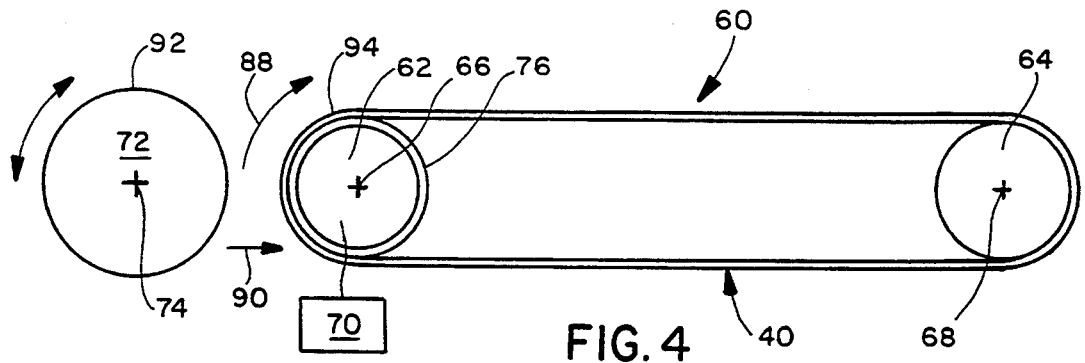
FIG. 4 is a schematic side elevation view of a system for grinding belt grooves in a preformed belt sleeve as shown in FIG. 3.
Figure 5:
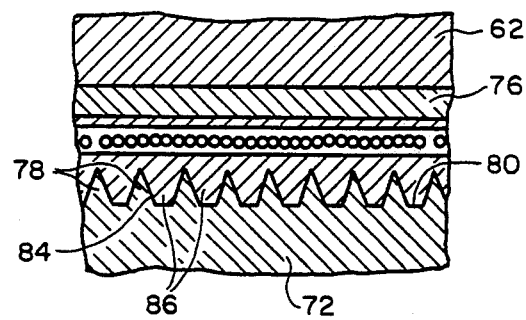
FIG. 5 is an enlarged cross-sectional view of a cooperating preformed belt sleeve and grinding element showing the grinding element fully extended into the belt sleeve.

The method of manufacturing power transmission belts, according to the present invention, to produce the flared fiber surfaces 38, is described with respect to FIGS. 3–5. In FIG. 3, a belt sleeve 40 is shown in place on a forming drum 42. The belt components are built in an inside out relationship sequentially from the outer surface 44 of a forming drum 42. Two layers of expansible canvas 46, 48 are first placed around the drum 42. Preferably, the canvas is rubber coated and one or more than two layers could be employed. The canvas is expansible primarily in one direction and in this case the canvas layers 46, 48 are arranged to be expansible most readily along the longitudinal extent of the belt. An adhesive rubber layer 50 is placed against the fabric layer 48 after which low elongation, high strength tensile cords 52 are put in place, followed by an adhesive rubber sheet 54. A rubber layer 56, thicker than the combined thicknesses of the layers 50, 54, is laminated to the surface 58 of the rubber layer 54. The rubber layer 56 has the aforementioned fibers 30 embedded therein in substantially parallel alignment.

The completed belt sleeve 40 is vulcanized by known pressure heating methods. Once the sleeve 40 is vulcanized, it is removed from the molding drum 42 and transferred to the system shown in FIG. 4 on which individuals ribs can be formed in accordance with the present invention.

The system at 60 in FIG. 4 consists of a drive drum 62 and a driven drum 64. The drums 62, 64 are rotatable about parallel, spaced axes 66, 68, respectively. The vulcanized belt sleeve 40 is trained about the drums 62, 64 and drawn sufficient taut so that the belt sleeve 40 is positively driven as a drive means 70 for the drum 62 rotates the drum 62.

A polishing/grinding element 72, preferably in the form of a grinding wheel, is provided to define the ribs in the compression rubber layer 56. The grinding element has a rotational axis 74 parallel to and spaced from the axes 66, 68 for the drive and driven drums 62, 64, respectively. The grinding element 72 can cooperate with the belt sleeve 40 in the vicinity of either the driving drum 62, as shown in FIG. 4, or the driven drum 64. With the arrangement shown, a protective sleeve 76 surrounds the drum 62 to prevent damage thereto during the rib forming step. A like sleeve (not shown) would be disposed on the driven drum 64 with the grinding element 72 repositioned to form the ribs thereat.

The grinding element 72 has a cylindrical body with axially spaced, circumferentially extending, V-shaped teeth 78 between which a web surface 80 is formed. As described more fully below, the grinding element 72 is advanced toward the belt sleeve 40 with the teeth 78 progressively penetrating the rubber layer 56 until the web 80 abuts the inner belt surface 82 to arrest relative movement between the grinding element 72 and belt sleeve 40, as shown in FIG. 5. The teeth 78 correspond in number and dimension to the longitudinal grooves 84 between the belt ribs 86.

During the rib forming step, the belt sleeve 40 is rotated in a clockwise direction i.e. in the direction of arrow 88 in FIG. 4. The grinding element 72 is preferably rotated oppositely to the direction of rotation of the drums 62, 64. However, it is within the scope of the invention to rotate the grinding element 72 in the same direction as the drums 62, 64.

As the drums 62, 64 and grinding element 72 are rotated, the grinding element 72 is advanced in the direction of arrow 90, perpendicular to its axis 74, into engagement with the rotating belt sleeve 40. According to the invention, the grinding/rib forming operation is performed in two separate steps as the grinding element 72 moves in a range between a first position, in which the teeth 78 thereon initially engage the belt sleeve 40, and a final position, in which the grinding element 72 is moved fully against the belt sleeve 40 and defines the final rib shape.

During the first part/step of the process, in which the grinding element teeth 78 engage and extend partially into the rubber layer 56, the relative rotational speed of the grinding element 72 and drums 62, 64 and the rate of relative movement of the grinding element 72 and belt sleeve 40, one against the other, are greater than during the second step. In a preferred arrangement, the first step is performed with the outer edge 92 of the grinding element 72 rotating at 15 m/sec or more, with the outer edge 94 of the belt sleeve 40 rotating at at least 0.07 m/sec, with the belt sleeve 40 and grinding element 72, during the first step, being advanced in a line, one against the other, at a rate of at least 0.3 mm/min. During the second step, the grinding element 72 and belt sleeve 40 move relative to each other at a rate of less than 0.3 mm/min until the final relative position therefor, as shown in FIG. 5, is realized. During the second step, the edge 92 of the grinding element 72 rotates at a speed of less than 15 m/sec, while the edge 94 of the belt sleeve 40 rotates at less than 0.07 m/sec. The speed of translation of the grinding element 72 and belt 40, one against the other, is less than 0.3 mm/min during the second step.

The surface roughness of the grinding wheel is between 80 to 200 meshes and preferably from 100 to 120 meshes during both the first and second steps of rib formation.

Figure 10:
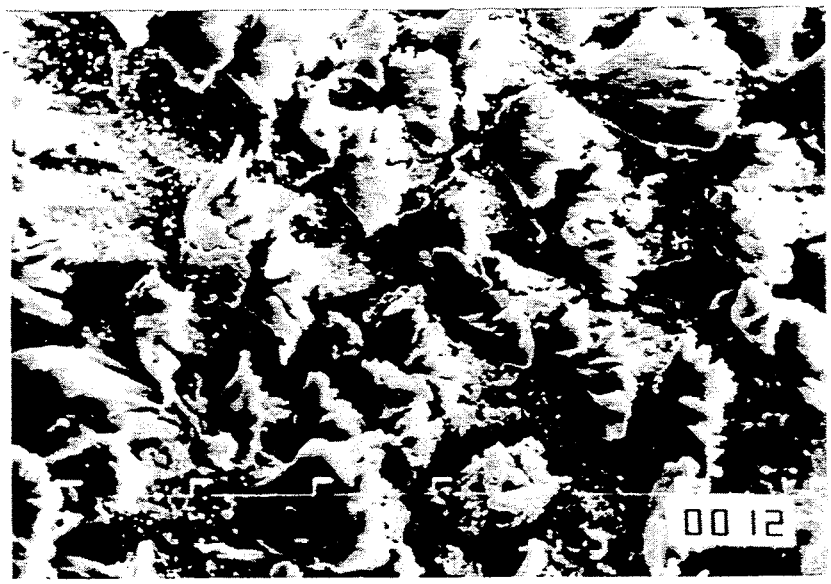
FIG. 10 is a photograph showing a magnified section of a belt flank formed according to the present invention.

In FIG. 10, a magnified section of one of the belt rib flanks is shown. As is apparent from the photograph, the fibers 30 are significantly flared at the exposed ends thereof to provide a sound dampening cushion with a reduced coefficient of friction to minimize the sound generation upon the belt flanks encountering and separating from the cooperating pulleys.

Figure 8:
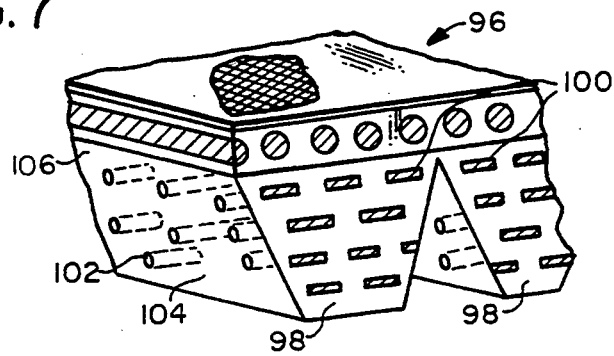
FIG. 8 is a view similar to that in FIG. 2 showing a V-ribbed belt made according to conventional manufacturing techniques.
Figure 11:
FIG. 11 is a view as that in FIG. 10 showing a belt flank made according to conventional manufacturing techniques.

FIG. 11 shows a magnified section of one of the flanks of the ribs of a prior art belt, such as that 96 shown in FIG. 8, and made according to conventional manufacturing techniques. The belt 96 in FIG. 8 has ribs 98 with fibers 100 embedded therein, as in the inventive belt. It can be seen, however, that the exposed ends 102 at the belt flank surface 104 are cleanly severed during manufacture. Consequently, the combined surface area of the fiber ends 102 is minimal compared to the overall cross section of the belt flank 104. This condition is shown clearly in FIG. 11.

Consequently, with the prior art belt 96, shown in FIGS. 8 and 11, the fibers 100 afford very little cushion and produce little sound dampening effect. Instead, the rubber 106 in which the fibers 100 are embedded, has a substantial area which contacts the belt pulleys in use. Due to the high coefficient of friction of the rubber 106, the rubber 106 tends to stick to the pulley surfaces as it encounters and separates therefrom during use. This condition produces a substantial amount of undesirable noise. At the same time, because the rubber 106 contacts the pulleys over a substantial area, it is prone to wearing significantly over time.

To demonstrate the advantages of the present invention, the sound generation of a belt made according to the present invention was compared with that for a prior art belt. The composition of each belt was the same.

The belt used in the test was a belt identified by number 5PK1104. The fibers used were monofilament vinyl alcohol fibers sold under the mark VINYLON. The fibers had an average length of 5 mm with a thickness of 6 denier. The fibers were mixed with a rubber matrix in a ratio of 20 parts by weight to 100 parts by weight of rubber. The belt was ground/polished in two steps with the first step terminating with the grinding wheel teeth 0.5 mm from their final depth. The high speed grinding in the first step was carried out with the grinding wheel rotating at 23.5 m/sec and the belt sleeve rotating at 0.082 m/sec. During the first step, the grinding wheel and belt sleeve were advanced, one against the other, at 0.6 mm/min.

During the second/low speed step, the belt sleeve and grinding wheel were advanced, one against the other, at .1 mm/min for the last 0.5 mm of cutting. During the second step, in which the last 0.5 mm was cut, the grinding wheel was rotated at 6.5 m/sec with the sleeve rotated at 0.018 m/sec.

Figure 6:
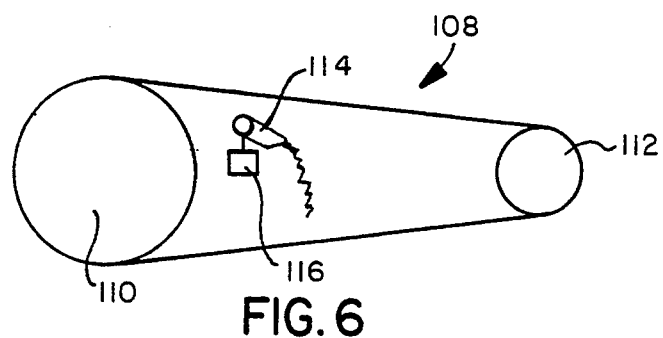
FIG. 6 is a schematic, side elevation view of a system for testing sound generation of a belt system.
Figure 7:
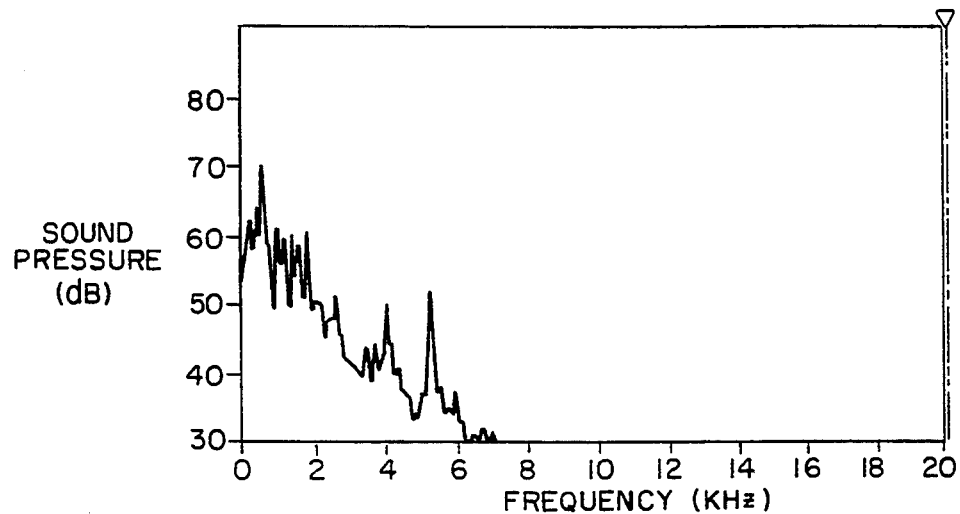
FIG. 7 is a graph showing the results of a sound generation test using a belt according to the present invention.
Figure 9:
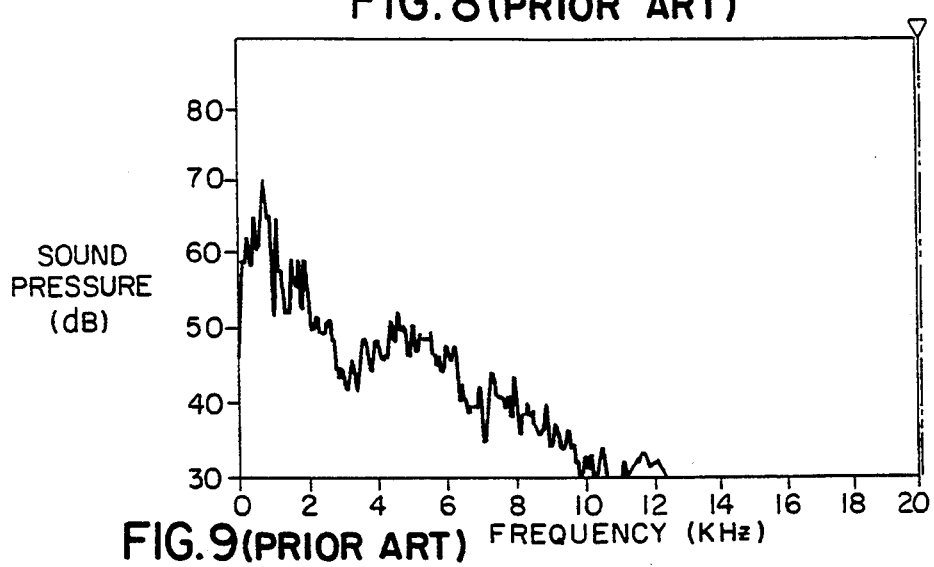
FIG. 9 is a graph showing the results of a sound generation test for a prior art belt such as that in FIG. 8.

Noise generated by the belts in use was them compared. The noise test was conducted on a system such as that shown at 108 in FIG. 6. The system 108 has a driving pulley 110 and a driven pulley 112. The diameter of the driving pulley 110 was 170 mm and the diameter of the driven pulley 112 was 72 mm. The belts were operated at 90 kgf initial tension at a speed of 2,000 rpm for 20 minutes, then decelerated to 600 rpm. A microphone 114 was located with its sensing end 116, shown schematically in FIG. 6, 10 cm from the driving pulley 110. The sound generated was graphed, with the graphs for the inventive belt shown in FIG. 7 and for the prior art belt in FIG. 9.

It can be seen that the prior art belt generated considerably higher sound levels. The sound was very effectively damped by the fibers in the inventive belt over the audible range of 4–20 KHz, thereby preventing abnormal noise generation, as at startup in an automobile.

The foregoing disclosure of specific embodiments is intended to be illustrative of the broad concepts comprehended by the invention.

We claim:

1. A method of forming a power transmission belt, said method comprising the steps of:
    providing a belt sleeve defining an axis and having a rubber layer with elongate fibers embedded therein and extending generally parallel to each other in a first line;
    rotating said belt sleeve about its axis;
    providing a grinding element for cutting said rubber layer and fibers to define ribs with oppositely facing flanks;
    urging said rotating belt sleeve and grinding element, one against the other in first and second steps and, as an incident thereof, causing the grinding element to define said oppositely facing flanks,
    said belt sleeve and grinding element being urged one against the other transversely of the first line at a first speed during said first step and at a second speed different than said first speed during said second step.

2. The method of forming a power transmission belt according to claim 1 wherein said first speed is greater than said second speed.

3. The method of forming a power transmission belt according to claim 1 wherein the first step speed is at least 0.3 mm/min.

4. The method of forming a power transmission belt according to claim 1 wherein the second step speed is less than 0.3 mm/min.

5. The method of forming a power transmission belt according to claim 1 including the step of rotating the grinding element about an axis as the rotating belt sleeve and grinding element are urged one against the other.

6. The method of forming a power transmission belt according to claim 5 wherein the belt sleeve axis and grinding element axis are substantially parallel and the belt sleeve and grinding element rotate oppositely about their respective axes.

7. The method of forming a power transmission belt according to claim 6 wherein the belt sleeve has an outer edge and the outer edge during the first step rotates at at least 0.07 m/sec.

8. The method of forming a power transmission belt according to claim 7 wherein the grinding element has an outer edge and the outer edge during the first step rotates at at least 15 m/sec.

9. The method of forming a power transmission belt according to claim 4 wherein the belt sleeve has an outer edge and the outer edge of the belt sleeve during the second step rotates at no more than 0.07 m/sec.

10. The method of forming a power transmission belt according to claim 9 wherein the grinding element has an outer edge and the outer edge of the grinding element during the second step rotates at no more than 15 m/sec.

11. The method of forming a power transmission belt according to claim 1 wherein in the second step the belt sleeve and grinding element move relative to each other between 0.1 and 1 mm.

12. A method of forming a power transmission belt, said method comprising the steps of:
providing a belt sleeve defining an axis and having a rubber layer with elongate fibers embedded therein and extending generally parallel to each other in a first line;
rotating said belt sleeve about its axis;
providing a grinding element for cutting said rubber layer and fibers to define oppositely facing flanks;
rotating said grinding element about an axis;
urging said rotating belt sleeve and grinding element, one against the other, through a range to cause the grinding element to define said oppositely facing belt flanks; and
rotating the grinding element and rotating belt sleeve at a first relative rotational velocity during a first part of the range and at a second relative rotational velocity during a second part of the range.

13. The method of forming a power transmission belt according to claim 12 wherein the belt sleeve and the grinding element are urged one against the other from a first relative position in which the belt sleeve and grinding element initially engage to a final relative position in which the oppositely facing belt flanks are fully defined and the relative rotational velocity of the grinding element and belt sleeve is the slower of the first and second relative rotational velocities as the belt sleeve and grinding element move into the final relative position.

14. The method of forming a power transmission belt according to claim 12 wherein the belt sleeve and grinding element rotate oppositely about their respective axes.

15. The method of forming a power transmission belt according to claim 12 wherein each of the belt sleeve and grinding element has an outer edge, during the first part of the range the outer edge of the belt sleeve rotates at at least 0.07 m/sec and the outer edge of the grinding element rotates at at least 15 m/sec.

16. The method of forming a power transmission belt according to claim 12 wherein each of the belt sleeve and grinding element has an outer edge and during the second part of the range the outer edge of the belt sleeve rotates at 0.07 m/sec and the outer edge of the grinding element rotates at less than 15 m/sec.

17. The method of forming a power transmission belt according to claim 12 wherein the grinding element has a surface roughness of 80 to 200 meshes.

18. The method of forming a power transmission belt according to claim 12 wherein the grinding element has a surface roughness of 100 to 120 meshes.

19. The method of forming a power transmission belt according to claim 12 wherein said belt sleeve has a compression section, made at least partially from rubber, and a tension section, the fibers are embedded in the rubber of the compression section in an amount so that the fiber is 5 to 30 parts by weight to 100 parts by weight of rubber.

20. The method of forming a power transmission belt according to claim 12 wherein said belt sleeve has a compression section, made at least partially from rubber, and a tension section, the fibers are embedded in the rubber in the compression section in an amount such that the combined areas of the fiber surfaces exposed at the belt flanks is equal to 40-80% of the total surface area of the belt flanks in the compression section.

* * * * *